(12) United States Patent
Stemke

(10) Patent No.: US 8,142,184 B2
(45) Date of Patent: Mar. 27, 2012

(54) CLOSED COOLING SYSTEM FOR TOOLS OF PLASTIC PROCESSING MACHINES

(75) Inventor: Lothar Stemke, Döbeln (DE)

(73) Assignee: Stemke Kunststofftechnik GmbH, Doebeln (DE)

( * ) Notice: Subject to any disclaimer, the term of this patent is extended or adjusted under 35 U.S.C. 154(b) by 669 days.

(21) Appl. No.: 11/920,303

(22) PCT Filed: May 12, 2006

(86) PCT No.: PCT/EP2006/062280
§ 371 (c)(1),
(2), (4) Date: Dec. 3, 2007

(87) PCT Pub. No.: WO2006/120248
PCT Pub. Date: Nov. 16, 2006

(65) Prior Publication Data
US 2008/0197537 A1 Aug. 21, 2008

(30) Foreign Application Priority Data

May 12, 2005 (DE) .......... 10 2005 021 961
Dec. 9, 2005 (DE) .......... 10 2005 058 963

(51) Int. Cl.
*B22C 9/06* (2006.01)
*B22D 17/22* (2006.01)

(52) U.S. Cl. ..... 425/552; 425/143; 425/144; 425/192 R; 425/526; 425/547; 249/79; 249/111

(58) Field of Classification Search .......... 425/72.1, 425/143, 144, 191, 384, 378.1, 404, 445, 425/446, 526, 543, 547, 548, 552, 192 R, 425/55, 2; 249/79, 80, 111
See application file for complete search history.

(56) References Cited

U.S. PATENT DOCUMENTS
2,672,032 A * 3/1954 Towse ............... 62/293
(Continued)

FOREIGN PATENT DOCUMENTS
DE   25 17 186   10/1976
(Continued)

OTHER PUBLICATIONS
European Search Report, Nov. 17, 2008.

*Primary Examiner* — Joseph Del Sole
*Assistant Examiner* — Seyed Masoud Malekzadeh
(74) *Attorney, Agent, or Firm* — Collard & Roe, P.C.

(57) ABSTRACT

Tools of plastics processing machines are cooled over their surface and/or at particular points as soon as compound supply is finished. Heat is thus suitably withdrawn from the shaped compound, ensuring the fastest possible cooling and shortening cycle times. The invention relates to a closed, coolant-filled cooling system for tools of plastics processing machines having at least one compressor, a supply pipe, a tool region to be cooled and a discharge pipe, the supply pipe being connected to the outlet of the compressor and the discharge pipe being connected to the inlet of the compressor, while at least one open end of the supply pipe plunges into at least one bore arranged in the tool region to be cooled, and an open end of the discharge pipe is sealed to this bore. The supply pipe and the discharge pipe may be combined in a coaxial pipe with the supply pipe arranged in the centre and the discharge pipe enveloping the supply pipe.

8 Claims, 4 Drawing Sheets

U.S. PATENT DOCUMENTS

Figure 1:
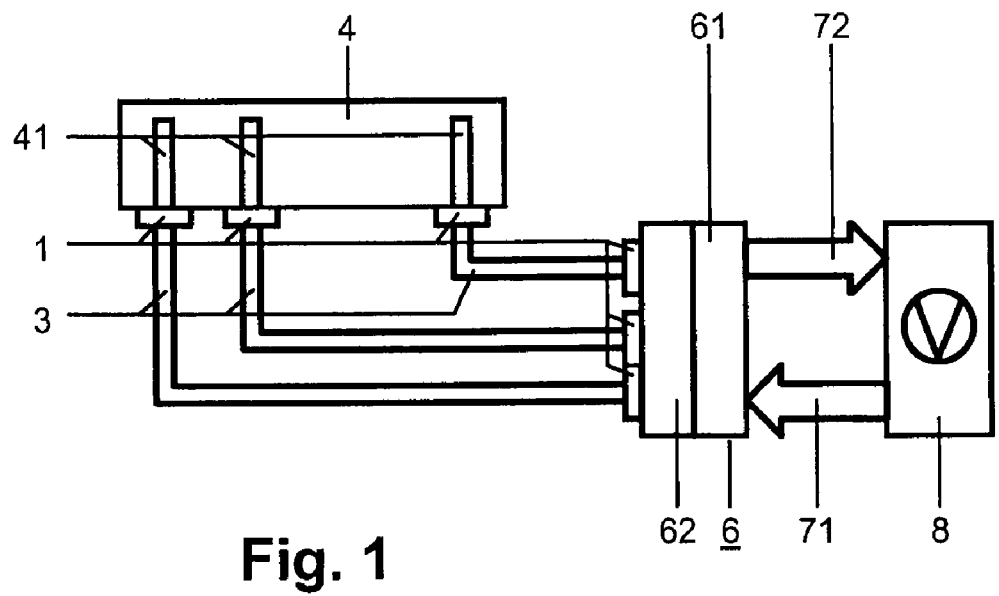

| Patent No. | | | Date | Inventor | Class |
|---|---|---|---|---|---|
| 3,108,339 | A | * | 10/1963 | Bucy | 164/254 |
| 3,169,272 | A | * | 2/1965 | Maxson | 425/377 |
| 3,196,198 | A | * | 7/1965 | Rex | 264/328.16 |
| 3,482,815 | A | * | 12/1969 | Naturale | 249/180 |
| 3,667,248 | A | | 6/1972 | Carlson | |
| 3,690,802 | A | * | 9/1972 | Fischer et al. | 425/526 |
| 3,797,984 | A | * | 3/1974 | Yago et al. | 425/543 |
| 4,054,629 | A | * | 10/1977 | Wang et al. | 264/520 |
| 4,063,867 | A | | 12/1977 | Jannière | |
| 4,091,069 | A | * | 5/1978 | Allen | 264/328.16 |
| 4,151,243 | A | * | 4/1979 | Allen | 264/219 |
| 4,177,238 | A | * | 12/1979 | Allen | 264/328.16 |
| 4,208,177 | A | * | 6/1980 | Allen | 425/404 |
| 4,212,623 | A | * | 7/1980 | Allen | 425/547 |
| 4,260,348 | A | * | 4/1981 | Graham | 425/144 |
| 4,275,864 | A | * | 6/1981 | Richards | 249/79 |
| 4,340,340 | A | * | 7/1982 | Brown et al. | 425/526 |
| 4,422,840 | A | * | 12/1983 | Posch et al. | 425/472 |
| 4,446,084 | A | * | 5/1984 | Rowley | 264/40.6 |
| 4,655,280 | A | * | 4/1987 | Takahashi | 165/47 |
| 4,676,241 | A | * | 6/1987 | Webb et al. | 128/207.14 |
| 4,689,000 | A | * | 8/1987 | Kouichi et al. | 425/67 |
| 4,759,708 | A | * | 7/1988 | Hestehave et al. | 425/526 |
| 4,872,827 | A | * | 10/1989 | Noda | 425/526 |
| 4,934,918 | A | * | 6/1990 | Outland | 425/144 |
| 4,966,544 | A | * | 10/1990 | Mitake | 425/552 |
| 5,275,444 | A | * | 1/1994 | Wythoff | 285/90 |
| 5,285,841 | A | * | 2/1994 | Yamauchi et al. | 164/348 |
| 5,310,430 | A | * | 5/1994 | McCall, Jr. | 134/33 |
| 5,382,147 | A | * | 1/1995 | Miura et al. | 425/144 |
| 5,498,150 | A | * | 3/1996 | Check | 425/526 |
| 5,542,467 | A | * | 8/1996 | Carpentier | 165/70 |
| 5,553,893 | A | * | 9/1996 | Foti | 285/147.1 |
| 6,168,740 | B1 | * | 1/2001 | Koch et al. | 264/237 |
| 6,176,700 | B1 | * | 1/2001 | Gellert | 425/547 |
| 6,203,310 | B1 | * | 3/2001 | Matysek | 425/547 |
| 6,276,922 | B1 | * | 8/2001 | Huston et al. | 425/547 |
| 6,344,163 | B1 | * | 2/2002 | Ashley | 264/310 |
| 6,367,765 | B1 | * | 4/2002 | Wieder | 249/141 |
| 6,425,752 | B1 | * | 7/2002 | Check | 425/526 |
| 6,601,819 | B2 | * | 8/2003 | Mizukusa | 249/79 |
| 6,770,239 | B2 | * | 8/2004 | Oueslati et al. | 264/538 |
| 6,827,323 | B2 | * | 12/2004 | Minemoto | 249/79 |
| 6,827,569 | B2 | * | 12/2004 | Wieder | 425/130 |
| 7,147,457 | B2 | * | 12/2006 | Iten | 425/547 |
| 7,607,633 | B2 | * | 10/2009 | Zeppenfeld | 249/80 |
| 2002/0182281 | A1 | * | 12/2002 | Minemoto | 425/86 |
| 2002/0187217 | A1 | * | 12/2002 | McDonald et al. | 425/547 |
| 2003/0039716 | A1 | | 2/2003 | Mizukusa | |
| 2006/0121150 | A1 | * | 6/2006 | Plass et al. | 425/533 |

FOREIGN PATENT DOCUMENTS

| | | |
|---|---|---|
| DE | 199 18 428 | 12/2000 |
| JP | 04 065214 | 3/1992 |

\* cited by examiner

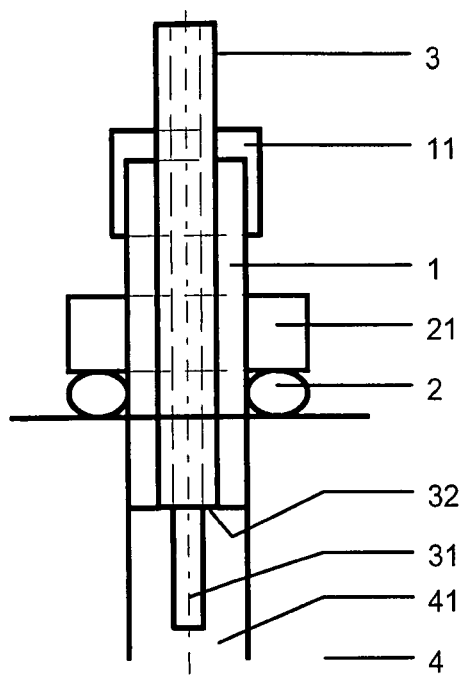
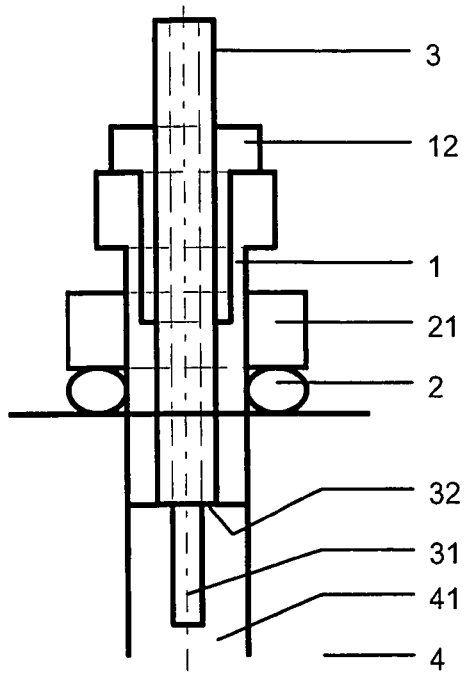
Fig. 3
Fig. 4
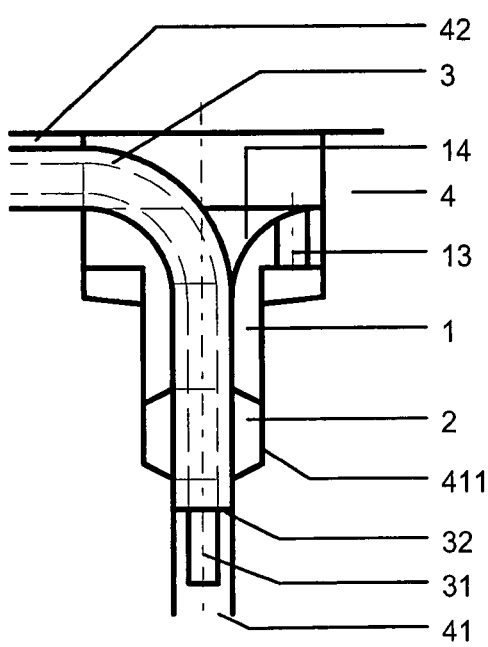
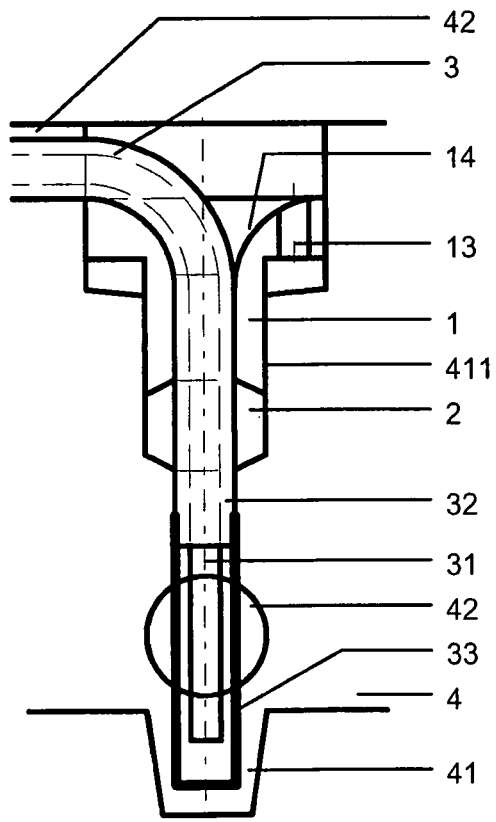
Fig. 5
Fig. 6

CLOSED COOLING SYSTEM FOR TOOLS OF PLASTIC PROCESSING MACHINES

CROSS REFERENCE TO RELATED APPLICATIONS

Applicant claims priority under 35 U.S.C. §119 of German Application No. 10 2005 02 1961.6 filed on May 12, 2005, and German Application No. 10 2005 05 8963.4 filed on Dec. 9, 2005. Applicant also claims priority under 35 U.S.C. §365 of PCT/EP2006/062280 filed on May 12, 2006. The international application under PCT article 21(2) was not published in English.

The tools of plastic-processing machines are cooled in a point-wise or areal manner in order to remove the heat from the moulding batch, after the pouring, in a purposeful manner so that the quickest possible cooling may contribute to shorten the cycling times. Particular care is however to be expended to prevent the removal of heat from adversely affecting the quality of the casts.

The DE 199 18 428 discloses a process to cool tools with carbon dioxide ($CO_2$), whereby tool regions at excessive temperatures are to be cooled by a purposeful expansion of the carbon dioxide. The preferred regions of the tool are those where because of excessive tool temperatures shiny spots or differences in lustre appear on the plastic articles, where depressions occur, the release of the mould occasions problems or generally wherever excessive and/or tool-damaging temperatures arise. The compressed carbon dioxide supply occurs through small tubes or flexible hoses. When exiting the supply lines, the compressed carbon dioxide expands, thus removing heat from the surrounding material. Thanks to the continuing flow of the carbon dioxide, the expanded gas is removed from the tool across the empty space between the supply line and the walls of the expansion space, so as to enable it to escape to the atmosphere or to be recaptured, through a special system, for later reprocessing. The escaping carbon dioxide is ecologically hazardous, as it may favour the hothouse effect. On the other side, the recapturing and reprocessing of the gas is subject to a non-negligible technical effort and thus additional costs, as the reprocessing demands an appropriate plant and the gas must also be supplied to said plant.

As a result of this situation, the task of the invention is to realize a cooling system for the tools of plastic-processing machines capable of preventing a load on the environment as well as reducing the cycling times at high levels of efficiency.

The task is solved according to the teaching of the main claim, by employing a closed cooling system to cool the tools. To this purpose, the tool is provided with at least one borehole admitting a cooling medium through a supply line, where the borehole leads to a discharge line connected to the inlet of a compressor, whose outlet is tied into the supply line. It is advantageous to provide a closed cooling system filled with a refrigerating medium for the tools of the plastic processing machines and comprising at least one compressor, a supply line, a tool region to be cooled and a discharge line, where the supply line is connected to the outlet and the discharge line to the inlet of the compressor, while on the other hand at least one open end of the supply line dips into at least one borehole provided in the tool region to be cooled, and an open end of the discharge line is tightly connected to this borehole. The outlet of the compressor may in this case first lead to a buffer store, so as to hold a largely constant pressure in the discharge line while making an adequate volume of cooling medium available at all times. The supply line and the discharge line may be combined in a coaxial conduit, where the supply line is placed on the inside and the discharge line surrounds it. It is in this case irrelevant whether the supply line and the discharge line are, as a whole or singly or in several sections, conformed as a coaxial conduit or are conformed, as a whole or singly or in several sections, as single or parallel lines. The passing-through conformation as a coaxial conduit produces the minimum demand on volume and the best possible transition from the line to the expansion space of the borehole. In the sense of the formulated task, it has also been shown that the counter-current flow of the compressed cooling medium in the internal supply line and the expanded gas in the surrounding discharge line improves the action of the cooling system according to the invention, as compared to using parallel yet separate lines.

Other favourable improvements and configurations can be derived from the subordinate claims. The invention is advantageously developed by the fact that the coaxial conduit formed by the supply line and discharge line is connected to the borehole by a coaxial bushing. The supply line is in this case coaxially run through the bushing body and projects into the borehole, while the bushing connects the discharge line with the borehole and seals off the borehole to the outside. The coaxial line is held inside the bushing by a fastening device set up on the side turned away from the tool. The coaxial bushing according to the invention is advantageously configured in a cylindrical shape on the side turned away from the tool. The cylindrical region may be provided with an external thread, so as to allow the coaxial line to be frictionally fastened in the bushing by a box nut which is internally crossed by the coaxial line. The cylindrical region may on the other hand be provided with an internal thread, so as to allow the coaxial line to be frictionally fastened in the bushing by a hollow screw passed by the coaxial line. For a particularly advantageous configuration of the bushing to route the coaxial line flush with the external surface of the tool, the outlet opening of the hollow screw turned away from the tool is to be conformed in a bell shape, and the curved outer side of the bell is to have at least one point of attack for a tool, so as to allow a torque to be applied to the hollow screw. Another favourable development of the invention lies in the fact that the coaxial bushing is conformed in a tubular manner extending over the side of the tool, the discharge line is connected to the tubular region, the supply line projects into the tubular region and the free end of the tubular region is tightly closed. This allows to both purposefully supply particularly deep boreholes with a cooling medium, as well as in particular to cross the hollow spaces in the tool, such as for instance by conduits for surface cooling or channels for instrument leads. In any arrangement, a multiple number of cooling points is a must for a cooling of the tools. In order to supply them with a cooling medium, an extension of the invention provides for a channel distributor with a first and a second channel, whose first channel is connected through the supply line with the compressor outlet and whose second channel is connected through the discharge line with the compressor inlet, where the first channel is provided with a multiple number of outlets and the second channel is provided with an equal number of inlets, so that the internal lines of the coaxial conduits can be connected to the outlets of the first channel, and the external lines of the coaxial conduits can be connected to the inlets of the second channel. This extended invention is particularly advantageous if the coaxial conduits are connected to the channels by coaxial bushings. The connecting lines between the compressor and the channel distributor may be conformed as single or parallel lines as well as a coaxial conduit. Apart from this it is advantageous, in order to achieve an efficient heat removal, if at least one outlet of the first channel and/or one inlet of the second channel is connected to the channel over a throttle, so as to supply each expansion space with a precisely correct amount of cooling medium. It is then particularly advantageous to connect each throttle to a controlling or regulating device, so as to set up a cooling system in the fashion of a common-rail system. It is also part of the invention if the supply line and the discharge line are conformed as single lines or double lines, if their connection occurs by using a parallel bushing while passing the supply line through the bushing body and as deeply as possible into the borehole, and if the passage through the bushing body connects the discharge line with the borehole. At a number of cooling points in a tool, coaxial conduits, single and double lines may also be suitably combined with each other.

Figure 2:
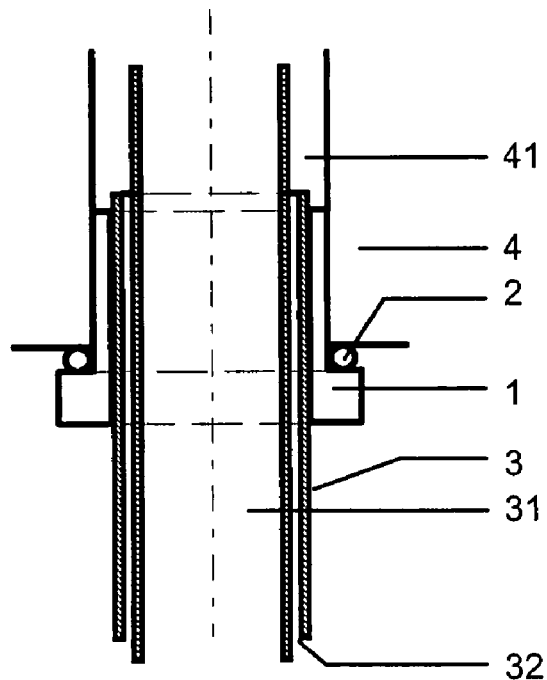
Figure 7:
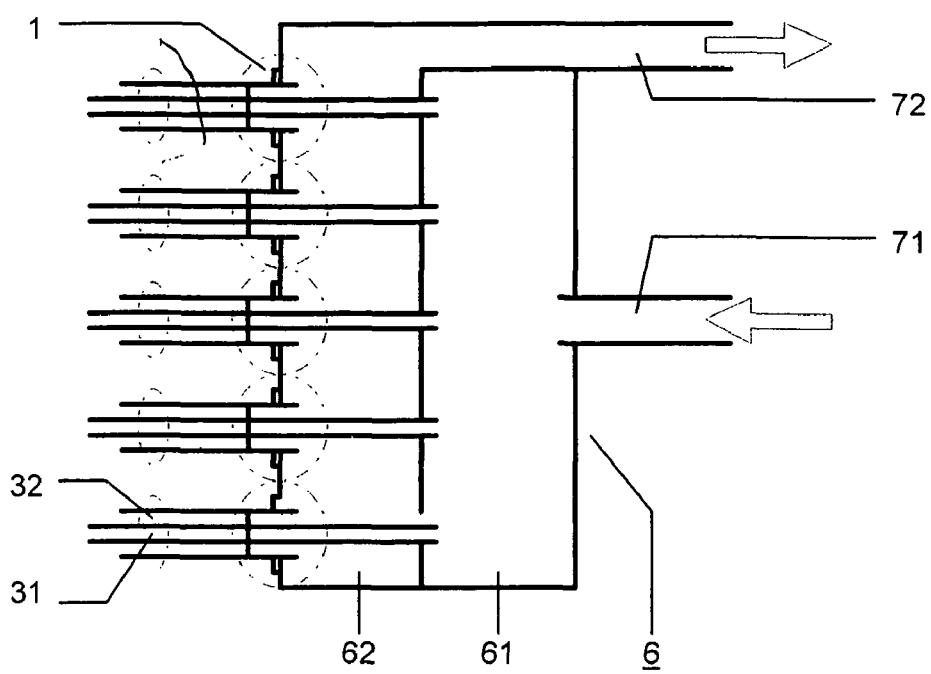
Figure 8:
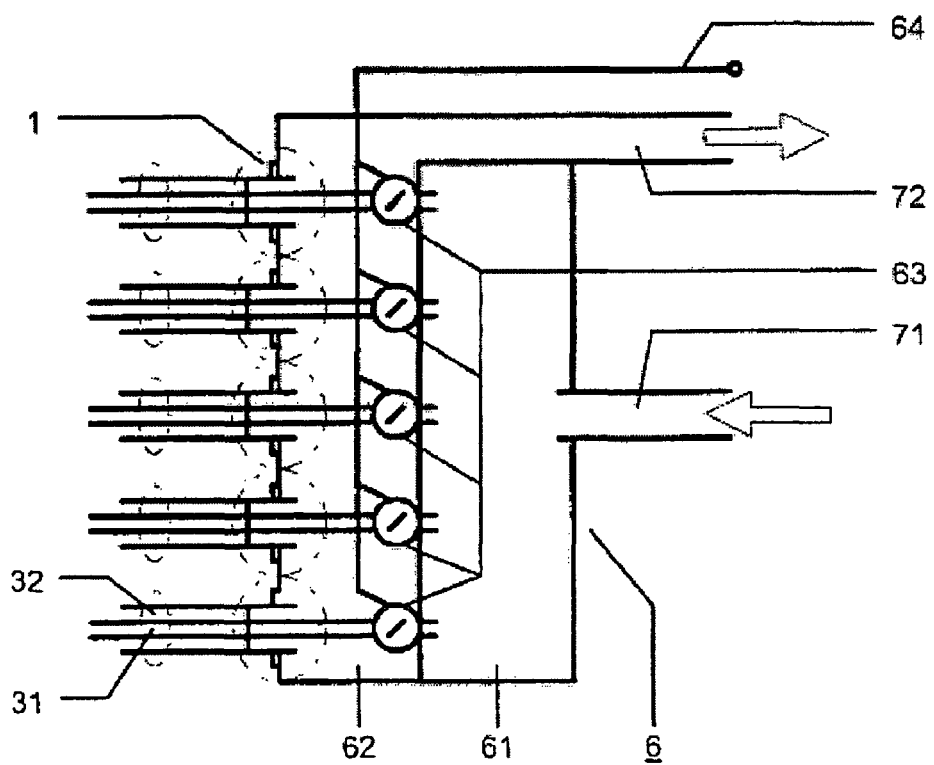

With the aid of drawings, the characteristics of the invention will be described in detail on a preferred example of an embodiment. The drawings show, in:

FIG. 1 a functional diagram of a cooling system according to the invention;

FIG. 2 a simplified coaxial bushing;

FIG. 3 a coaxial bushing according to FIG. 2, with a box nut;

FIG. 4 a coaxial bushing according to FIG. 2, with a hollow screw;

FIG. 5 a coaxial bushing according to FIG. 2, in the form of a hollow screw with a bell-shaped outlet opening;

FIG. 6 a coaxial bushing according to FIG. 5, with a tubular extension;

FIG. 7 a first embodiment of a channel distributor;

FIG. 8 a second embodiment of a channel distributor; and

Figure 9:
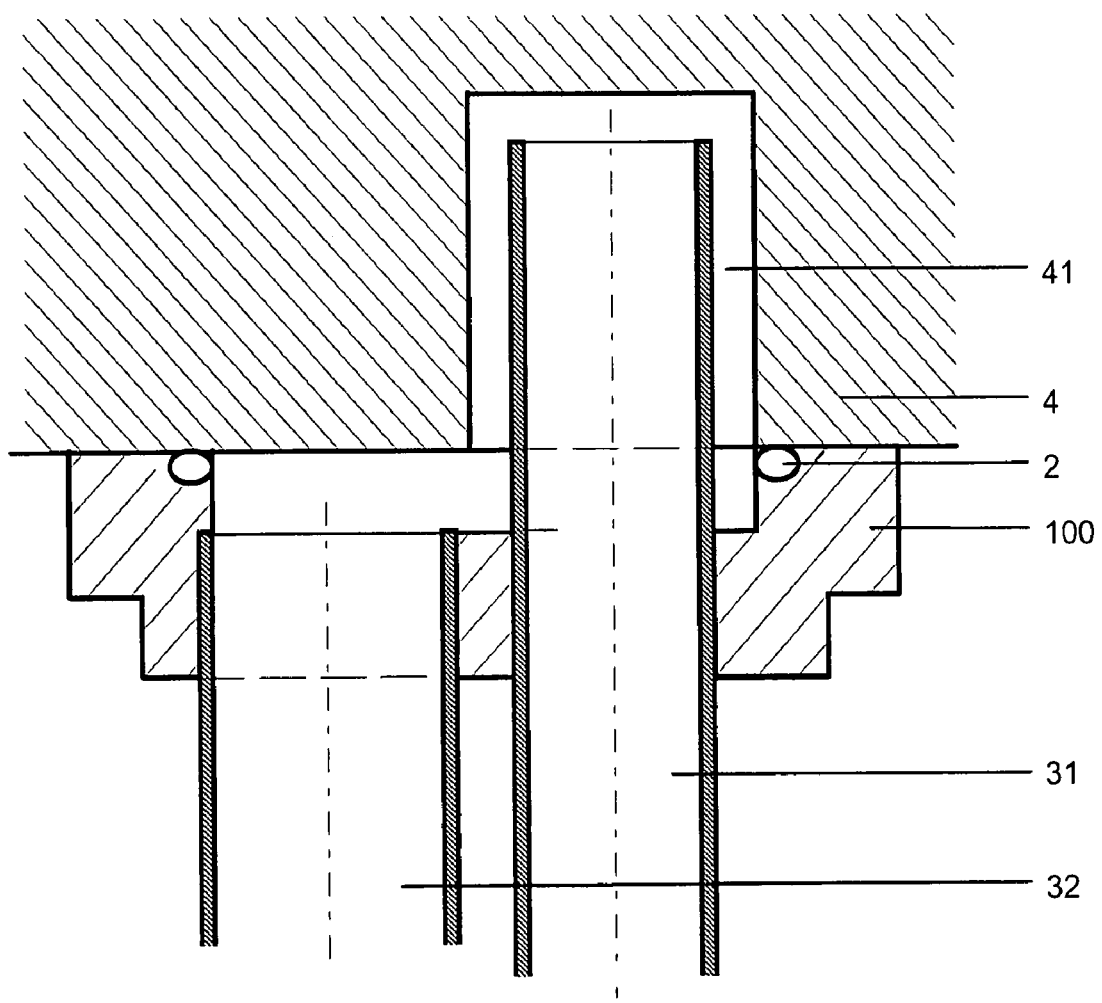

FIG. 9 a parallel bushing according to the invention.

FIG. 1 shows a tool 4 with a multiple number of expansion boreholes 41 provided in the same. The expansion boreholes 41 are in practice provided in projections, ribs and the like, because these areas are to be cooled particularly well to achieve the quickest possible cooling and therefore the shortest possible cycling times. The expansion boreholes 41 are connected through coaxial bushings 1 to coaxial conduits 3, where the internal supply lines 31 (see below) are projecting into the expansion boreholes 41 as far as possible, while the outlets of the expansion boreholes 41 are connected to the external discharge lines 32 (see below). The configuration of the coaxial bushings 1 is detailed below. The coaxial conduits 3 are led to a channel distributor 6, as will be explained in the following with reference to the FIGS. 7 and 8. The channel distributor 6 comprises a first channel 61 connecting the internal supply lines 31 of the coaxial conduits 3, and a second channel 62 connecting the external discharge lines 32 of the coaxial conduits 3, where the connection of the coaxial conduits 3 advantageously occurs through coaxial bushings 1. The first channel 61 forms a supply channel and the second channel 62 forms a discharge channel. The supply channel 61 is connected to the outlet of a compressor 8 by a pressurized line 71. The discharge channel is instead connected to the inlet of the compressor 8 through a suction line 72. The cooling system closed in this manner contains a suitable volume of cooling medium.

FIG. 2 shows a coaxial bushing 1 according to the invention, which is tightly fastened to a tool 4. The type of fastening occurs in this case in accordance with the conditions of the tool 4, where the bushing 1 is in principle screwed into the tool 4 and a ring seal safely seals off the expansion borehole 41 against the atmosphere. As the internal line of the coaxial conduit 3 is passed through the bushing 1, the free end of the supply line 31 projects as far as possible into the expansion borehole 41. The expansion borehole 41 opens up into the discharge line 32 within the region encompassed by the ring seal 2.

FIG. 3 shows a coaxial bushing 1 according to the invention with a box nut 11 to hold the coaxial conduit 3 inside the coaxial bushing 1. The box nut 11 is screwed over the cylindrical region of coaxial bushing 1 that is turned away from the tool and provided with an external thread, so that the coaxial conduit 3 formed by the internal supply line 31 and the external discharge line 32 surrounding the latter is held inside the passage of the bushing by friction. The bushing 1 is screwed into the expansion borehole 41 provided inside the tool 4 in such a manner that the expansion borehole 41 is on one hand opening up into the discharge line 32 and on the other hand sealed off against the outside by the ring seal 2, while the supply line 31 is projecting as far as possible into the expansion borehole 41. The ring seal 2 is fastened by a counter-nut screwed into the bushing body.

FIG. 4 shows a coaxial bushing 1 according to the invention, with a hollow screw 12 to hold the coaxial conduit 3 in the coaxial bushing 1. The hollow screw 12 is screwed into the cylindrical region of the coaxial bushing 1 which is turned away from the tool and provided with an internal thread, so that the coaxial conduit 3 is formed by the internal supply line 31 and the discharge line 32 surrounding the latter and held inside the bushing by friction. The bushing 1 is screwed into the expansion borehole 41 provided inside the tool 4 so that the expansion borehole 41 is on one hand opening up into the discharge line 32, and on the other hand sealed to the outside by the ring seal 2, while the supply line 31 projects into the expansion borehole 41 as far as possible. The ring seal 2 is fixed by a counter nut screwed into the bushing body.

FIG. 5 shows a coaxial bushing 1 according to the invention, in the form of a hollow screw with a bell-shaped outlet opening 14 to hold the coaxial conduit 3. The hollow screw bushing 1 is screwed into the expansion borehole 41 provided in the tool 4, so that the expansion borehole 41 is on one hand opening up into the discharge line 32 and on the other hand sealed against the outside by the ring seal 2, while the supply line 31 projects into the expansion borehole 41 as far as possible. The free side of the tool 4 is provided with flow channels 42 in which the coaxial conduits 3 are arranged in a manner flush with the surface. The expansion boreholes 41 are therefore opening up into a region 411 of a larger diameter and provided with an internal thread, into which the hollow screw bushing 1 is screwed while also fixing the ring seal 2. The latter is in turn holding the coaxial conduit 3 inside the bushing passage by friction. The curved side of the bell-shaped outlet opening 14 is advantageously provided with at least one borehole 13 provided outside the bushing axis, in which a suitably formed stud driver can engage so as to allow a torque to be applied to screw the hollow screw bushing 1 in or out while still leaving the curved side of the bell-shaped opening 14 smooth and provided with a suitable curving radius, and the coaxial conduit 3 can be passed through the hollow screw bushing 1 without buckling.

FIG. 6 shows a hollow screw bushing 1 according to FIG. 5, where the coaxial conduit 3 on the side of the tool is conformed as a tubular extension while the discharge line 32 is connected to a tubular region 33, the supply line 31 projects inside the tubular region 33 and the free end of the tubular region 33 is tightly closed. This allows it to both purposefully supply particularly deep expansion boreholes 41 with a cooling medium, and in particular to also to cross the hollow spaces 42 inside the tool 4, such as for instance flow tubes for surface cooling or channels for instrument leads.

FIG. 7 shows a channel distributor 6 provided with a multiple number of coaxial conduits 3 as well as a suction line 72 and a pressurized line 71. The coaxial conduits 3 are connected, as to a tool, to the channel distributor 6 through coaxial bushings 1 according to the invention. The channel distributor 6 consists of a supply channel 61 and a discharge channel 62, where the supply lines 31 of the coaxial conduits 3 cross the discharge channel 62 and open up into the supply channel 61, while the discharge lines 32 of the coaxial conduits 3 are connected to the discharge channel 62.

FIG. 8 shows a channel distributor 6 provided with a multiple number of coaxial conduits 3 as well as a suction line 72 and a pressurized line 71. The coaxial conduits 3 are connected, as to a tool, to the channel distributor 6 through coaxial bushings 1 according to the invention. The channel distributor 6 consists of a supply channel 61 and a discharge channel 62, where the supply lines 31 of the coaxial conduits 3 cross the discharge channel 62 and open up into the supply channel 61, while the discharge lines 32 of the coaxial conduits 3 are connected to the discharge channel 62. In order to enable the cooling medium supply to each expansion borehole to be optimized in time and/or in volume in a manner befitting the conditions, the channel distributor 6 is equipped with controlling or regulating devices, while the supply lines 31 are connected to the supply channel 61 through throttles 63. The throttles 63 are in turn connected through an appropriately designed control line system 64 to a regulator that processes for instance the temperatures measured in the vicinity of the expansion boreholes and determines the parameters of the tool, material and work piece as well as of the throttling positions so that an optimum cooling of the tool 4 and of the work piece can reduce the cycling time without adversely affecting quality.

FIG. 9 shows a parallel bushing 100 according to the invention, which is tightly fastened to a tool 4. The type of fastening follows in this case the conditions of the tool 4, where in principle the bushing 100 is screwed into the tool 4 and a ring seal 2 seals off the borehole 41 against the atmosphere. The free end of the supply line projects into the borehole 41 as far as possible. Within the region surrounded by the ring seal 2, the borehole 41 opens up into the discharge opening 32, where as a difference from a coaxial bushing, the discharge passage of the parallel bushing 100 surrounded by the ring seal 2 is laterally enlarged with respect to the supply line 31. In their further path, the supply line 31 and the discharge line 32 are advantageously configured in the form of a double conduit.

The characteristics of the invention outlined above, as well as its embodiments may be combined in any manner, without thereby abandoning the framework of the invention.

The invention claimed is:

1. A cooling system for a tool of a plastic processing machine, where the tool is provided with at least one borehole supplied with a cooling medium through a first supply line and the at least one borehole opens up into a first discharge line, wherein the first supply line and the first discharge line are combined in a coaxial conduit that connects the at least one borehole with a channel distributor where the first supply line is arranged in an internal position and the first discharge line in a position surrounding the first supply line, the channel distributor being completely outside of and not integral with the tool, the coaxial conduit is connected to the at least one borehole through a first coaxial bushing, and the first supply line is coaxially passed through a bushing body of the first coaxial bushing and projects inside the at least one borehole, while the first coaxial bushing connects the first discharge line with the at least one borehole and seals off the at least one borehole to an outside of the tool, where the coaxial conduit is held fast in the first coaxial bushing through a fastening device set up on a side of the first coaxial bushing turned away from the tool, the channel distributor is provided with a first channel and a second channel, the first channel is connected to a compressor outlet of a compressor through a second supply line and the second channel is connected to a compressor inlet of the compressor through a second discharge line, the first supply line of the coaxial conduit is connected to a channel outlet of the first channel, and the first discharge line of the coaxial conduit is connected to a channel inlet of the second channel through at least one second coaxial bushing.

2. The cooling system according to claim 1, wherein the first coaxial bushing conforms on the side turned away from the tool in a cylindrical region and the cylindrical region is provided with an external thread, so that the coaxial conduit can, through a box nut internally crossed by the coaxial conduit, be fastened in the first coaxial bushing by friction.

3. The cooling system according to claim 1, wherein the first coaxial bushing conforms, on the side turned away from the tool, in a cylindrical region and the cylindrical region is provided with an internal thread, so that the coaxial conduit can, through a hollow screw internally crossed by the coaxial conduit, be fastened in the first coaxial bushing by friction.

4. The cooling system according to claim 3, wherein an outlet opening of the first coaxial bushing turned away from the tool is conformed in a bell shape, and a curved side of the bell shape presents at least one point of attack for a work tool, so that a torque can be applied to the first coaxial bushing.

5. The cooling system according to claim 1, wherein the first coaxial bushing extends, on a tool side of the tool, in a tubular region, where the first discharge line is connected to the tubular region, the first supply line projects into the tubular region and a free end of the tubular region is closed.

6. The cooling system according to claim 1, wherein the tool is provided with a multiple number of boreholes, the first channel of the channel distributor has a multiple number of channel outlets, and the second channel has a number of channel inlets equal to the multiple number of channel outlets.

7. The cooling system according to claim 6, wherein at least one channel outlet of the first channel and at least one channel inlet of the second channel is connected to the first or second channel, respectively, over a throttle.

8. The cooling system according to claim 7, wherein the throttle is connected to a controlling or regulating device.

* * * * *